United States Patent
Bunker

[11] Patent Number: 6,000,672
[45] Date of Patent: *Dec. 14, 1999

[54] TORQUE ARM STABILIZER ASSEMBLY FOR A TRANSMISSION HOUSING OF A VEHICLE

[76] Inventor: Donald D. Bunker, 28182 Palmada, Mission Viejo, Calif. 92692

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,402

[22] Filed: Jul. 2, 1996

[51] Int. Cl.⁶ ..................................................... F16M 13/00
[52] U.S. Cl. .............................................................. 248/634
[58] Field of Search ..................................... 248/634, 632, 248/638, 674, 647; 280/673, 671, 665, 688, 124.1, 124.13

[56] References Cited

U.S. PATENT DOCUMENTS

| | | | |
|---|---|---|---|
| 2,214,942 | 9/1940 | Taub | 248/634 X |
| 2,659,619 | 11/1953 | Kishline et al. | 287/85 |
| 3,033,587 | 5/1962 | Perish | 280/665 |
| 3,237,962 | 3/1966 | Kraus et al. | 280/673 |
| 3,432,127 | 3/1969 | Philipp | 248/634 |
| 3,551,990 | 1/1971 | Wehner | 280/673 X |
| 3,784,180 | 1/1974 | Massinger | 267/66 |
| 3,856,325 | 12/1974 | Willetts | 280/124 R |
| 4,575,114 | 3/1986 | Camp | 280/673 |
| 4,690,425 | 9/1987 | Kubo | 280/673 |
| 4,809,960 | 3/1989 | Kakimoto et al. | 267/141 |
| 4,840,395 | 6/1989 | Sturmon | 280/688 |
| 4,943,092 | 7/1990 | Haraguchi | 280/660 |
| 5,058,867 | 10/1991 | Hadano et al. | 267/141.3 |
| 5,100,114 | 3/1992 | Reuter et al. | 267/293 |
| 5,275,429 | 1/1994 | Bunker | 280/688 |
| 5,472,226 | 12/1995 | Bunker | 280/681 |

Primary Examiner—Ramon O. Ramirez
Assistant Examiner—Stephen S. Wentsler
Attorney, Agent, or Firm—Stetina Brunda Garred & Brucker

[57] ABSTRACT

A one-piece bushing for placement within a sleeve of a securement bracket and for surrounding a portion of a structure to be retained within the sleeve of the bracket. The bushing has a generally central longitudinal opening complimentary in shape to a cross-sectional profile of a portion of the structure to be situated in the opening and an outside wall complimentary in shape to an inner wall of the sleeve of the bracket. The bushing is formed of a resiliently deformable material that is preferably substantially inert. Of particular applicability is a bushing for a torque arm stabilizer assembly of a vehicle transmission housing in which the bushing has a generally central longitudinal opening complimentary in shape to a cross-sectional profile of a portion of a torque arm to be situated in the opening. Methodology for retrofitting a two-piece bushing assembly with the present one-piece bushing includes removal of existing bushing segments and connector hardware from the bracket sleeve and thereafter positioning the one-piece bushing in the sleeve.

4 Claims, 2 Drawing Sheets

Fig. 1 (PRIOR ART)
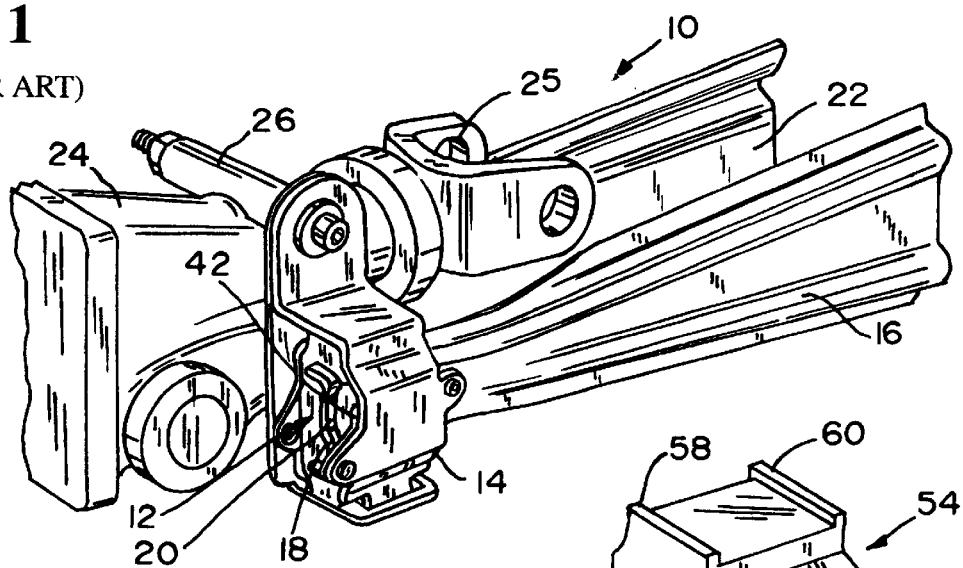
Fig. 3
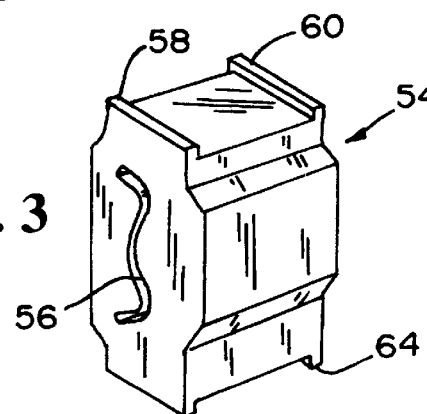
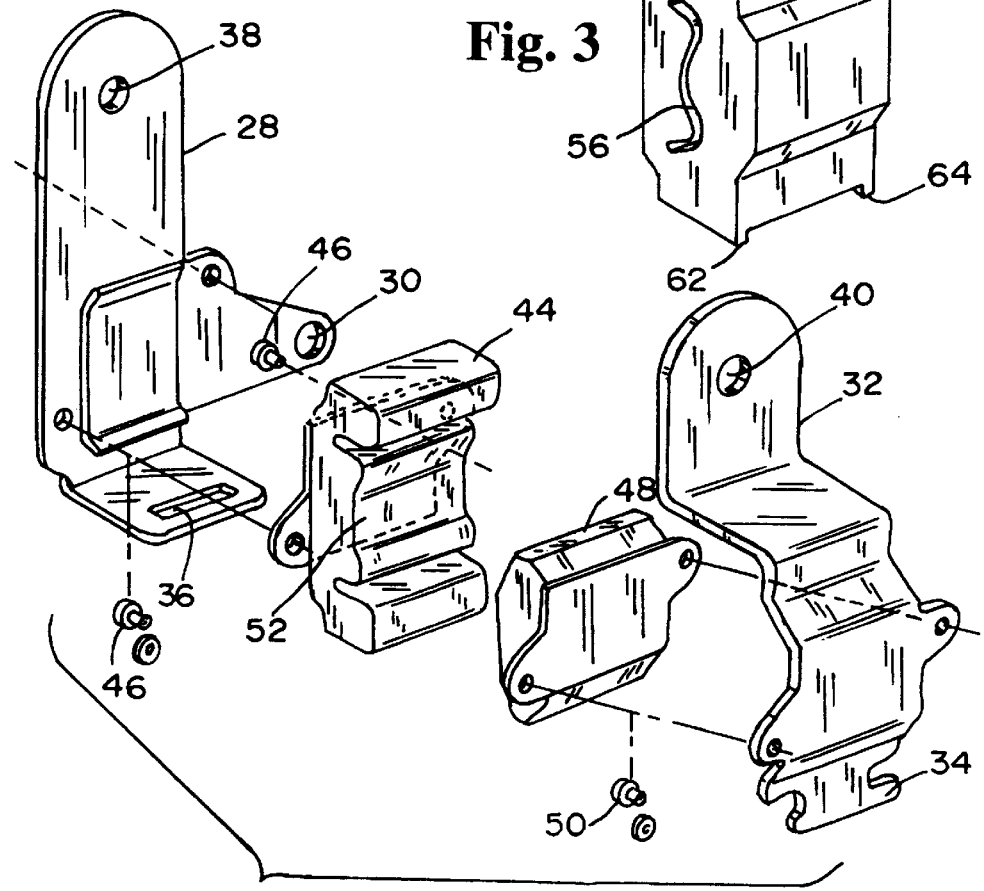
Fig. 2 (PRIOR ART)

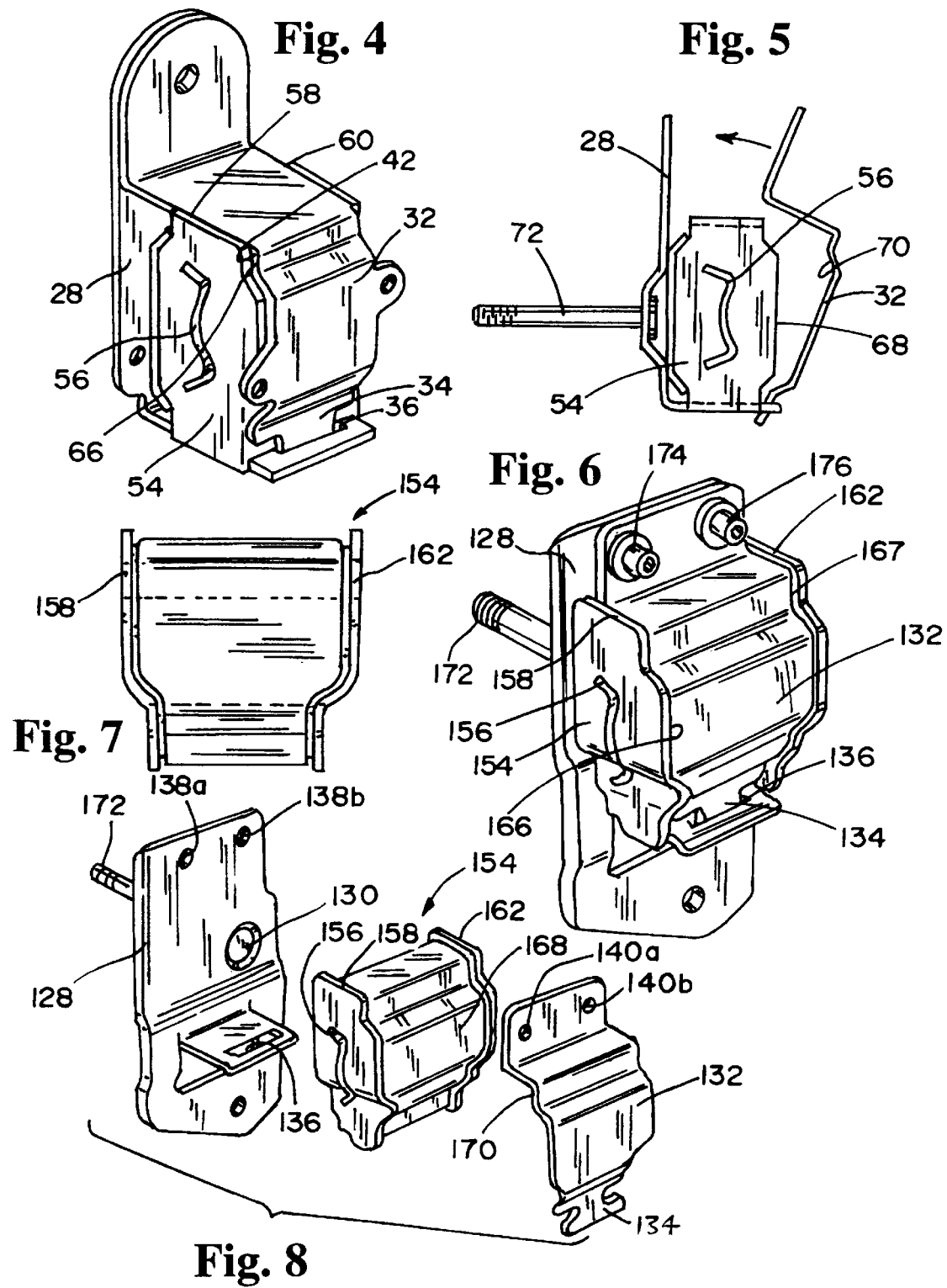

TORQUE ARM STABILIZER ASSEMBLY FOR A TRANSMISSION HOUSING OF A VEHICLE

BACKGROUND OF THE INVENTION

I. Field of the Invention

This invention relates in general to a bushing for a structure retained by a bracket, and in particular to a one-piece bushing to be retained within the bracket and securing therein a structure. A method of installing the bushing within the bracket is included.

II. Description of the Prior Art

The retention of a structure by a bracket surrounding a bushing that surrounds a portion of the structure is a typical manner of securing that structure. An example of this arrangement is found in the stabilization of motor vehicle transmission housings. Specifically, a motor vehicle having rear-wheel drive typically has torque arm stabilizer assemblies mounted to its transmission housing such that a respective torque arm extends rearwardly on each side of the transmission along the drive train. These stabilizer assemblies function to inhibit undesirable movement of the transmission housing during driving and the resultant negative effects on handling, performance and premature wear of associated transmission and drive train components.

Mounting of a torque arm to the transmission housing is typically accomplished with a bracket that forms an elongate sleeve within which is a bushing assembly surrounding a portion of the torque arm. The sleeve is formed between an inner bracket member secured to the transmission housing and an outer bracket member removably secured to the inner bracket member. Each of the resulting opposing inner surfaces of the inner and outer bracket members has a rubber bushing component riveted thereto, thereby providing a two-piece bushing with a portion of the torque arm situated therebetween. These bushing components are provided with longitudinal cut-outs to accommodate the cross-sectional profile of the torque arm.

Because the bushing components described above are constructed of a rubber product, they tend to crack, dry out and otherwise degrade over a period of time. Unfortunately, however, bushing components alone presently cannot be replaced because they are not made available. Instead, a vehicle owner is forced to purchase and replace the entire assembly of torque-arm-and-bracket to simply replace the bushing which is, of course, new in the replacement assembly. This is wasteful and costly, and must be repeated again in the future because the replacement bushing components are likewise constructed of a rubber component.

In view of the above concerns, it is apparent that a need is present for a new bushing that can replace a deteriorating bushing without requiring replacement of an entire structural assembly. Accordingly, a primary object of the present invention is to provide a replacement bushing for a structure wherein the bushing is of one-piece construction complimentarily shaped to receive therein a portion of the structure such as a torque arm to be retained.

Another object of the present invention is to provide a replacement bushing whose outside shape is complimentary to the shape of a retaining bracket.

Yet another object of the present invention is to provide a replacement bushing constructed of a substantially inert and resiliently deformable material.

Still another object of the present invention is to provide methodology for retrofitting prior-art two-piece bushings with a bushing of one-piece construction.

These and other objects of the present invention will become apparent throughout the description thereof which now follows.

SUMMARY OF THE INVENTION

The present invention is a bushing for placement within a sleeve of a securement bracket and for surrounding a portion of a structure to be retained within the sleeve of the bracket. The bushing comprises a one-piece material having a generally central longitudinal opening complimentary in shape to a cross-sectional profile of a portion of the structure to be situated in the opening. The bushing likewise has an outside wall complimentary in shape to an inner wall of a sleeve of a bracket for placement of the bushing within the sleeve in contact with the inner wall thereof. Typically, the sleeve of the bracket has a first end with a first rim and a second end with a second rim. Responsively, the bushing has a first end with a flange to be situated outside of and in contact with the first rim of the sleeve and a second end with a flange to be situated outside of and in contact with the second rim of the sleeve. The flanges so positioned prohibit longitudinal movement of the bushing. The bushing is formed of a resiliently deformable material that is preferably substantially inert, with polyurethane being a most preferred material that provides desired bushing characteristics as well as exceptional longevity of use.

Of particular applicability is a bushing for a torque arm stabilizer assembly of a vehicle transmission housing. The bushing comprises an elongate one-piece material having a generally central longitudinal opening complimentary in shape to a cross-sectional profile of a portion of a torque arm to be situated in the opening. This bushing is situated within an elongate sleeve of a bracket as described above, and the bracket is mountable to the transmission housing. The one-piece bushing of the present invention can be used to replace a prior-art two-piece bushing that is no longer fully operable. Specifically, invention methodology for such replacement comprises disassembly of the sleeve and removal therefrom of the segments of the two-piece bushing. The segments generally are held in place by connectors such as rivets or the like extending through the walls of the sleeve, and these are removed. Thereafter, the inventive one-piece bushing is situated in the sleeve which is reassembled for subsequent securement. Incorporation of this inventive bushing in a torque arm stabilizer assembly results in superior torque arm behavior and a superior bushing life span.

BRIEF DESCRIPTION OF THE DRAWINGS

An illustrative and presently preferred embodiment of the invention is shown in the accompanying drawings in which:

FIG. 1 is a perspective view of a portion of a torque arm stabilizer assembly showing a prior art bushing construction within a bracket;

FIG. 2 is an exploded perspective view of the elongate bracket of FIG. 1 showing in detail the prior art bushing of FIG. 1;

FIG. 3 is a perspective view of a one-piece bushing of the present invention;

FIG. 4 is a perspective view of the bracket of FIGS. 1 and 2 having therein the one-piece bushing of FIG. 3;

FIG. 5 is an end elevation view of the bracket and bushing illustrated in FIG. 4;

FIG. 6 is a perspective view of a second embodiment of a bracket having therein a second embodiment of a one-piece bushing;

FIG. 7 is a front elevation view of the bushing of FIG. 6; and

FIG. 8 is an exploded perspective view of the embodiment of FIG. 6.

DETAILED DESCRIPTION OF THE PREFERRED EMBODIMENT

Referring to FIG. 1, a portion of a torque arm assembly 10 including a prior art bushing 12 within an elongate bracket 14 is shown. A torque arm 16 having a profile 18 has a forward portion 20 thereof within the bushing 12 and extends rearwardly for mounting (not shown) to thereby stabilize, in concert with an identical opposing torque arm 22, a transmission housing 24 to which the bracket 14 is mounted with a threaded upper mounting bolt 26 as known in the art. The opposing torque arm 22 has a bracket (not shown) identical to the bracket 14 for like securement to the transmission housing 24. Conventional mounting hardware such as a boltable U-shaped bracket 25 secures the transmission housing 24 to appropriate vehicle components as known in the art. As is apparent, FIG. 1 shows only a portion of the transmission housing 24.

The bracket 14 comprises an inner bracket member 28 securable to the transmission housing 24 with a threaded bolt 72 (FIG. 5) passing through an opening 30 in alignment with a receiving hole (not shown) in the housing 24. The bracket 14 additionally has an outer bracket member 32 having a retainer lip 34 extending there below for insertion into a retainer opening 36 at the base of the inner bracket member 28 for retention therein while the outer bracket member 32 is moved toward the inner bracket member 28 as shown by the arrow in FIG. 5. When so assembled, the mounting holes 38, 40 of the inner and outer bracket members 28, 32, respectively, are in alignment and receive the threaded mounting bolt 26. When the inner and outer bracket members 28, 32 are assembled, an elongate sleeve 42 for housing a bushing is formed.

As is evident in FIG. 2, the prior art bushing 12 is of two-piece construction. In particular, an inner bushing member 44 is held by rivets 46 to the inner bracket member 28, while a complimentary outer bushing member 48 is held by rivets 50 to the outer bracket member 32. The inner bushing member 44 is provided with a shaped profile 52 which is complimentary to the profile 18 of the torque arm 16 and which, in concert with the outer bushing member 48, provides an opening to accommodate the forward portion 20 of the torque arm 16. As earlier noted, the bushing members 44, 48 are typically constructed of a rubber product and therefore tend to crack, dry out and degrade over time, thus necessitating replacement. Such replacement now involves replacing the entire torque arm assembly rather than only the bushing members 44, 48.

FIGS. 3 to 5 illustrate the present invention. Specifically, in reference to FIG. 3, a one-piece, elongate bushing 54 constructed of polyurethane is shown as a replacement for the two-piece bushing 12 of the prior art. While polyurethane is the preferred construction material, any resiliently deformable material having substantially the same deformability and preferable inertness as that of polyurethane can be employed. The bushing 54 has a generally central longitudinal opening 56 complimentary in shape to the cross-sectional profile 18 of the forward portion 20 of the torque arm 16 (FIG. 1) such that the forward portion 20 can reside within the opening 56. The bushing 54 has two upper flanges 58, 60 and two lower flanges 62, 64 that function to maintain the bushing 54 within the sleeve 42 of the bracket 14 (FIG. 4). In particular, the upper and lower flanges 58, 62 are situated outside of and in contact with a portion of the forward rim 66 of the sleeve 42, while the upper and lower flanges 62, 64 are situated outside of and in contact with a portion of a rearward rim (not shown) identical to the forward rim 66 of the sleeve 42. As is apparent, longitudinal movement of the bushing 54 within the sleeve 42 is thereby prohibited by these flanges when the bushing 54 is in assembled configuration in the sleeve 42. As evident in FIG. 5, the bushing 54 has an outside wall 68 complimentary in shape to the inner wall 70 of the sleeve 42 as formed when the inner and outer bracket members 28, 32 are in assembled configuration. Prior to such assembly, the rivets 48, 50 are drilled out as known in the art to thereby provide a smooth inner wall 70. A threaded lower mounting bolt 72 (FIG. 5) extends through the opening 30 (FIG. 2) from the inner bracket member 28 for entry into a complimentarily-placed opening of the transmission housing 24.

Retrofitting an existing torque-arm bracket having a two-piece bushing is easily accomplished. In particular, and in reference to FIGS. 1 to 4, an operator first releases the outer bracket member 32 from the inner bracket member 28 to thereby expose the inner bushing segment 44 and outer bushing segment 48. Inner bushing segment 44 is disengaged from connector rivets 46 extending through the wall of the inner bracket member 28. Likewise, outer bushing segment 48 is disengaged from connector rivets 50 extending through the wall of the outer bracket member 32. The bushing segments 44, 48 are discarded and the rivets 46, 50 are removed as by being drilled out from the respective inner and outer bracket members 28, 32. Thereafter, the one-piece bushing 54 of the present invention is provided to be retained between the inner and outer bracket members 28, 32 as shown in FIG. 4, and the inner and outer bracket members 28, 32 are connected to each other. As is evident, retrofitting a two-piece bushing with the one-piece bushing of the present invention is accomplished without connector rivets or the like. Thus, and while not expected, should the one-piece bushing require future replacement, such replacement necessitates only a simple disengagement of the bracket members 28, 32 followed by hand removal and replacement of the one-piece bushing.

Referring to FIGS. 6 to 8, a second embodiment of a bracket and corresponding one-piece bushing 154 is illustrated. Specifically, the bracket comprises an inner bracket member 128 securable to the transmission housing 24 with a threaded bolt 172 passing through an opening 130 in alignment with a receiving hole (not shown) in the housing 24. The bracket additionally has an outer bracket member 132 having a retainer lip 134 extending there below for insertion into a retainer opening 136 of the inner bracket member 128. When the inner and outer bracket members 128, 132 are assembled, an elongate sleeve for housing a bushing is formed. When so assembled, the mounting holes 138a, 138b and 140a and 140b of the inner and outer bracket members 128, 132, respectively, are in alignment and receive securement bolts 174, 176.

A one-piece, elongate bushing 154 constructed of polyurethane as in the first embodiment is here shown. Likewise, the bushing 154 has a generally central longitudinal opening 156 complimentary in shape to the cross-sectional profile 18 of the forward portion 20 of the torque arm 16 such that the forward portion 20 can reside within the opening 156. The bushing 154 has two opposing flanges 158, 162 that substantially surround the perimeter of the bushing 154 at each end thereof and function to maintain the bushing 154 within the sleeve of the bracket. In particular, the flange 158 is situated outside of and in contact with the forward rim 166 of the sleeve, while the flange 162 is situated outside of and in contact with a portion of a rearward rim 167 identical to the forward rim 166 of the sleeve. As is apparent, longitudinal movement of the bushing 154 within the sleeve is thereby prohibited by these flanges 158, 160 when the bushing 154 is in assembled configuration in the sleeve. As evident in FIG. 8, the bushing 154 has an outside wall 168 complimentary in shape to the inner wall 170 of the sleeve as formed when the inner and outer bracket members 128, 132 are in assembled configuration.

The significant differences between the first embodiment shown in FIGS. 3 to 5 and the second embodiment shown in FIGS. 6 to 8 are found in the configurations of the brackets and of the one-piece bushing 54, 154. Such differences are occasioned by non-uniform size and design among various vehicle manufacturers. Because bushings of the present invention may well be after-market products employed as replacement parts, it is apparent that required size and design replication must occur for the replacement bushings to be usable. The stability of the one-piece bushing here described permits a user to experience a relatively inexpensive, yet highly-efficient and long-lasting, vehicle maintenance item.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A torque arm stabilizer assembly for a transmission housing of a vehicle, the assembly comprising:

a) an elongate torque arm having a cross-sectional profile;

b) a bracket securable to the transmission housing, said bracket comprising an elongate sleeve having a first end with a first rim, a second end with a second rim, and an inner wall having a shape; and c) a one-piece generally inert elongate bushing having a generally central longitudinal opening complimentary in shape to the cross-sectional profile of the torque arm for housing therein a portion of said torque arm and maintaining said torque arm in place, said bushing having an outside wall complimentary in shape to the inner wall of the sleeve, said bushing having a first end with a flange outside of and in contact with the first rim of the sleeve of the bracket and a second end with a flange outside of and in contact with the second rim of the sleeve of the bracket such that said bushing is stationary and generally longitudinally non-movable, and said bushing being disposed within and unfastened to said sleeve such that the inner wall of the sleeve and the outside wall of the bushing are in contact with each other.

2. A torque arm stabilizer assembly as claimed in claim 1 wherein the bracket comprises an inner bracket member securable to the transmission housing and an outer bracket member releasably securable to the inner bracket member, whereby the elongate sleeve is formed between the bracket members when the outer bracket member is secured to the inner bracket member.

3. A torque arm stabilizer assembly as claimed in claim 2 wherein the bushing is formed of a resiliently deformable material.

4. A torque arm stabilizer assembly as claimed in claim 1 wherein the bushing is formed of a resiliently deformable material.

* * * * *